(12) United States Patent
Kawabata

(10) Patent No.: US 10,203,082 B2
(45) Date of Patent: Feb. 12, 2019

(54) VEHICLE LAMP

(71) Applicant: Stanley Electric Co., Ltd., Tokyo (JP)

(72) Inventor: Mari Kawabata, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/458,702

(22) Filed: Mar. 14, 2017

(65) Prior Publication Data

US 2017/0276316 A1    Sep. 28, 2017

(30) Foreign Application Priority Data

Mar. 24, 2016 (JP) ................... 2016-059948

(51) Int. Cl.
| | | |
|---|---|---|
| *B60Q 1/00* | (2006.01) | |
| *B60Q 1/26* | (2006.01) | |
| *B60Q 1/30* | (2006.01) | |
| *F21V 8/00* | (2006.01) | |
| *F21S 43/14* | (2018.01) | |
| *F21S 43/239* | (2018.01) | |
| *F21S 43/241* | (2018.01) | |
| *F21S 43/243* | (2018.01) | |
| *F21S 43/245* | (2018.01) | |
| *F21S 43/249* | (2018.01) | |
| *F21Y 115/10* | (2016.01) | |

(52) U.S. Cl.
CPC .......... *F21S 43/243* (2018.01); *B60Q 1/0011* (2013.01); *F21S 43/14* (2018.01); *F21S 43/239* (2018.01); *F21S 43/241* (2018.01); *F21S 43/245* (2018.01); *F21S 43/249* (2018.01); *B60Q 1/2696* (2013.01); *B60Q 1/30* (2013.01); *F21Y 2115/10* (2016.08); *G02B 6/0045* (2013.01); *G02B 6/0063* (2013.01)

(58) Field of Classification Search
CPC .. F21S 48/2262; F21S 48/215; F21S 48/2243; F21S 48/2268; B60Q 1/0011; G02B 6/0016; G02B 6/002; G02B 6/0045; G02B 6/0063
See application file for complete search history.

(56) References Cited

U.S. PATENT DOCUMENTS 6,474,826 B1 * 11/2002 Tanaka ................. G02B 6/0018
                                                    362/23.16
6,935,764 B2 * 8/2005 Choi ..................... G02B 6/002
                                                    362/326

(Continued)

FOREIGN PATENT DOCUMENTS

JP        4742012 B2    8/2011

*Primary Examiner* — Alexander K Garlen
(74) *Attorney, Agent, or Firm* — Kenealy Vaidya LLP

(57) ABSTRACT

A vehicle lamp includes a plurality of light sources and a light guide plate configured to guide light from the plurality of light sources, the light guide plate has a light diffuser configured to diffuse the light, the light diffuser has a plurality of hole sections, the hole section passes through the light guide plate in a thickness direction thereof and includes a light guide emission surface and a light guide incident surface opposite to each other in a direction in which the light entering from one end surface advances, and a plurality of concave stripe section formed in parallel to a direction crossing with the direction in which the light advances is provided at the light guide emission surface and the light guide incident surface.

19 Claims, 8 Drawing Sheets

(56) References Cited

U.S. PATENT DOCUMENTS

| | | | | |
|---|---|---|---|---|
| 6,979,095 B2* | 12/2005 | Min | ............... | G02B 6/0016 359/599 |
| 8,297,828 B2* | 10/2012 | Park | ............... | G02B 6/002 362/612 |
| 2006/0083028 A1* | 4/2006 | Sun | ............... | G02B 6/0016 362/615 |
| 2006/0285356 A1* | 12/2006 | Tseng | ............... | G02B 6/0016 362/608 |

* cited by examiner

VEHICLE LAMP

CROSS-REFERENCE TO RELATED APPLICATION

Priority is claimed on Japanese Patent Application No. 2016-059948, filed Mar. 24, 2016, the content of which is incorporated herein by reference.

BACKGROUND

Field of the Invention

The present invention relates to a vehicle lamp.

Description of Related Art

In the related art, as a vehicle lamp mounted on a vehicle, a lamp in which a light source such as a light emitting diode (LED) or the like and a plate-shaped light guide member (a light guide plate) are combined is known (for example, see Japanese Patent No. 4742012).

The light guide plate allows light emitted from the light source to enter from one end surface (an incident surface), reflects the light by using a plurality of reflection cuts formed at one main surface (a reflection surface), and then, allows the light to exit from the other main surface (a light emission surface) to the outside. Accordingly, light can be emitted from the light emitting surface formed at a front surface of the light guide plate while the light from the light source is guided inside of the light guide plate. Such a vehicle lamp is used for, for example, a tail lamp or the like of a vehicle.

SUMMARY

Incidentally, the above-mentioned LED has a merit of reducing power consumption while providing a long lifetime. For this reason, in vehicle lamps in recent times, with advances in increased luminance of LEDs and reduction in cost, light sources adopting LEDs are gradually increasing.

However, while an LED has high directivity (straightness), light is not easily diffused. For this reason, in the above-mentioned vehicle lamp, when the plurality of LEDs are disposed in parallel along an incident surface of the light guide plate, so-called luminance (emission) nonuniformity in which portions of the light emitting surface of the light guide plate corresponding to positions of the LEDs glow strongly in a linear pattern may occur.

In the vehicle lamp, since visibility and appearance are deteriorated when such luminance nonuniformity occurs, a portion (a light diffuser) configured to diffuse light is installed at the light guide plate to reduce luminance nonuniformity.

For example, the invention disclosed in Japanese Patent No. 4742012 has a configuration in which through grooves having a circular or elliptical cross section that pass through a light guide plate in a thickness direction are formed as a light diffuser, and the through grooves are arranged along an end surface (an incident surface) of the light guide plate to be parallel to the incident surface and respectively correspond to the plurality of light sources.

In the case of the above-mentioned configuration, light passing through the through grooves can be diffused in a direction crossing with a direction in which the light advances. Meanwhile, light passing through centers of the through grooves linearly advances through the centers of the through grooves without being diffused. Accordingly, the above-mentioned luminance (emission) nonuniformity may occur due to the light passing through the centers of the through grooves.

An aspect of the present invention is directed to provide a vehicle lamp capable of suppressing the occurrence of luminance (emission) nonuniformity.

A vehicle lamp according to an aspect of the present invention includes a plurality of light sources; and a light guide plate configured to guide light from the plurality of light sources, wherein the plurality of light sources are disposed in parallel along one end surface of the light guide plate, the light guide plate has a light diffuser configured to diffuse the light in a direction crossing with a direction in which light entering from the one end surface advances, the light diffuser has a plurality of hole sections formed to respectively correspond to the plurality of light sources, the hole section passes through the light guide plate in a thickness direction and comprises a light guide emission surface and a light guide incident surface opposite to each other in the direction in which the light entering from the one end surface advances, and a plurality of concave stripe sections or a plurality of convex stripe sections formed in parallel to the direction crossing with the direction in which the light advances is provided at least at one of the light guide emission surface and the light guide incident surface.

In the above-mentioned configuration, the light entering the one end surface from each of the light sources can be diffused by the plurality of hole sections in the direction crossing with the direction in which the light advances. In addition, each of the hole section includes the light guide emission surface and the light guide incident surface that are opposite to each other in the direction in which the light advances, and the light can be diffused by the using the plurality of concave stripe section or convex stripe section formed at least at one of the light guide emission surface and the light guide incident surface without depending on a positions at which the light passes through the hole section. Accordingly, occurrence of luminance (emission) nonuniformity can be suppressed compared to a case when the plurality of light sources is disposed in parallel.

In addition, in the above-mentioned vehicle lamp, the concave stripe section or the convex stripe section may be formed in the light guide emission surface and the light guide incident surface, and are arranged to be shifted in the direction crossing with the direction in which the light advances with each other at the light guide emission surface side and the light guide incident surface side.

In the above-mentioned configuration, the light passing through the hole section can be efficiently diffused in the direction crossing with the direction in which the light advances.

In addition, in the above-mentioned vehicle lamp, a width of the light guide incident surface may be set to be larger than a width of the light guide emission surface in the direction crossing with the direction in which the light advances.

In the above-mentioned configuration, the light passing through the hole section can be widely diffused in the direction crossing with the direction in which the light advances.

In addition, in the above-mentioned vehicle lamp, the hole section may include a pair of concave surfaces that are disposed at both sides in the direction crossing with the direction in which the light advances and that connects the light guide emission surface and the light guide incident surface.

In the above-mentioned configuration, the light passing through the hole section can be widely diffused in the direction crossing with the direction in which the light advances by the pair of concave surfaces.

In addition, in the above-mentioned vehicle lamp, the plurality of hole sections may be formed to respectively correspond to the plurality of light sources and may be arranged in a multi-stage arrangement in the direction in which the light advances.

In the above-mentioned configuration, the light entering the one end surface from the light sources can be repeatedly diffused in the direction crossing with the direction in which the light advances by the plurality of hole sections arranged in a multi-stage arrangement in the direction in which the light advances.

According to the aspect of the present invention, it is possible to provide a vehicle lamp capable of suppressing occurrence of luminance (emission) nonuniformity.

DESCRIPTION OF EMBODIMENTS

Figure 1:
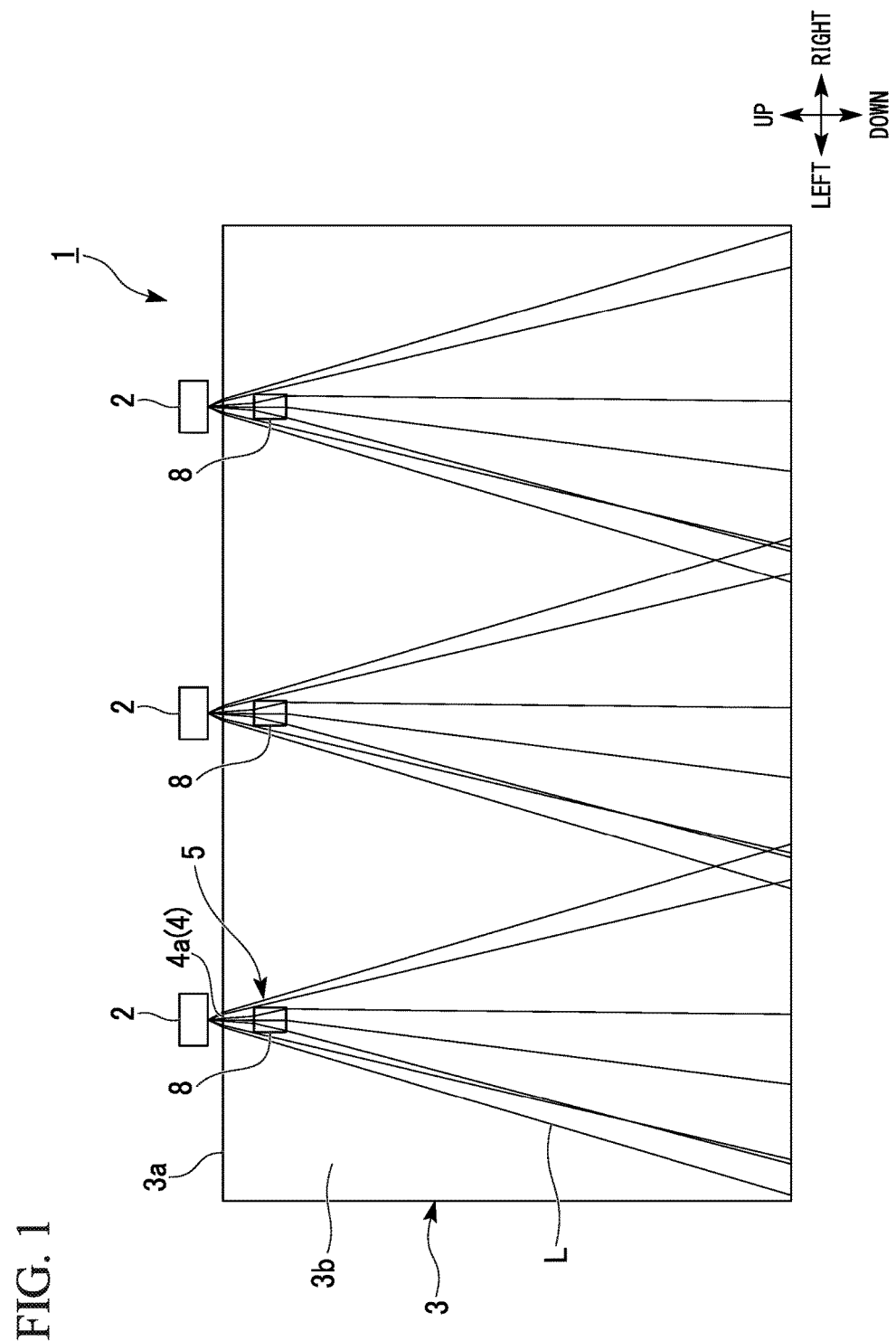
FIG. 1 is a plan view showing a configuration of a vehicle lamp according to an embodiment of the present invention.

Hereinafter, an embodiment of the present invention will be described in detail with reference to the accompanying drawings.

Further, in the drawings used in the following description, different dimensional scales of the components may be shown so that the components can be easily seen, and dimensional ratios and the like of the components are not always shown as same in reality.

As an embodiment of the present invention, for example, a vehicle lamp shown in FIG. 1 to FIG. 3 will be described.

Further, FIG. 1 is a plan view showing a configuration of a vehicle lamp 1. FIG. 2 is a cross-sectional view showing a configuration of a light guide plate 3 and an optical path of light L passing through the light guide plate 3. FIG. 3 is a plan view showing a configuration of a hole section 8 and an optical path of the light L passing through the hole section 8.

Figure 2:
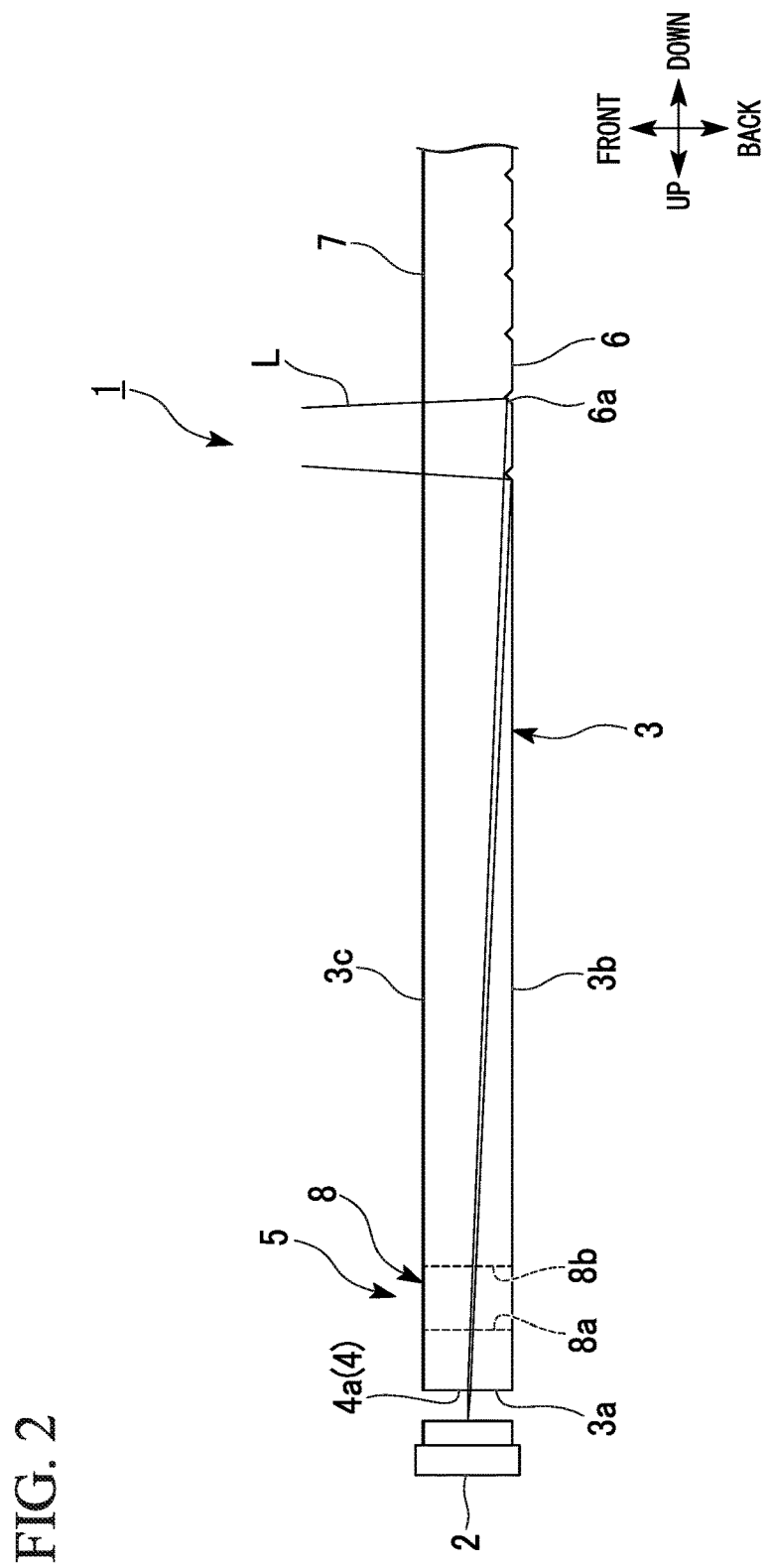
FIG. 2 is a cross-sectional view showing a configuration of a light guide plate and an optical path of light passing through the light guide plate.
Figure 3:
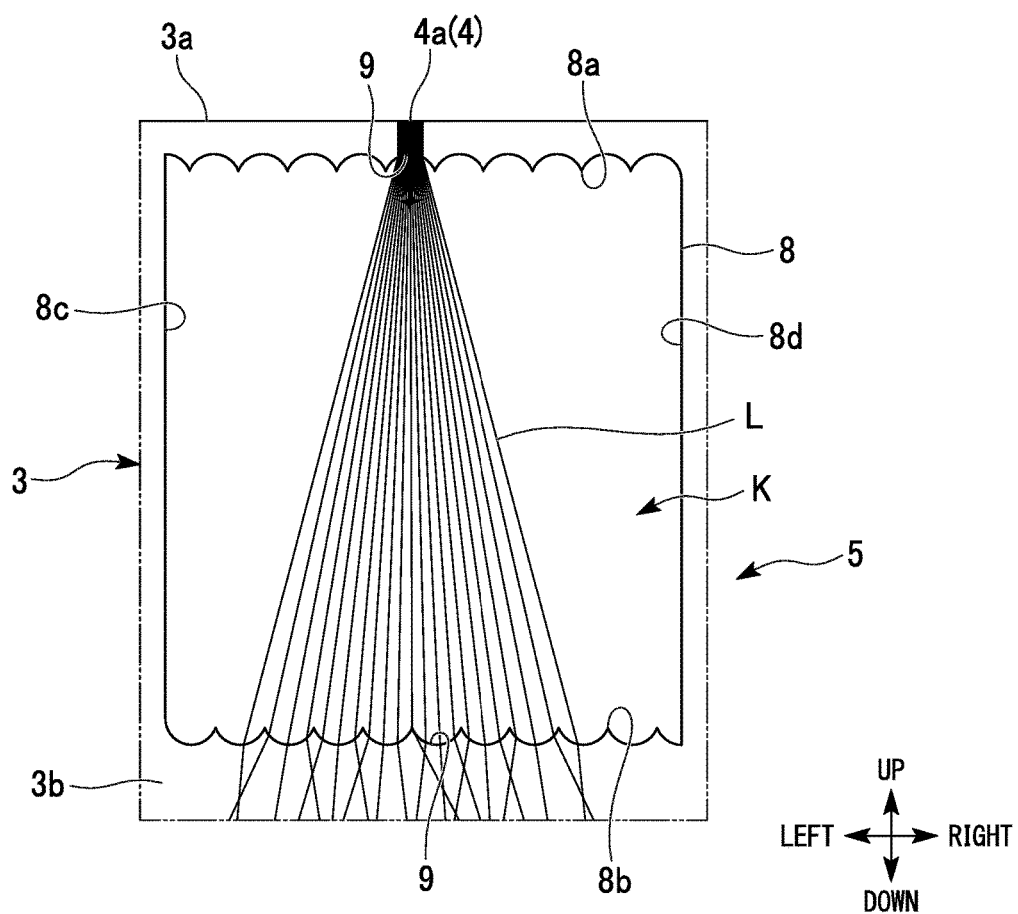
FIG. 3 is a plan view showing a configuration of a hole section and an optical path of light passing through the hole section.

As shown in FIG. 1 to FIG. 3, the vehicle lamp 1 of the embodiment is, for example, tail lamps mounted at both ends of a back section of a vehicle (not shown) to which the present invention is applied. Further, in the following description, the words "front," "back," "left," "right," "up," and "down" refer to directions when the vehicle lamp 1 is seen from a front surface thereof (a back side of the vehicle) unless specifically stated otherwise. Accordingly, directions when the vehicle is seen from the front surface thereof (a front side of the vehicle) are directions in which the front, back, left, and right are reversed.

Specifically, the vehicle lamp 1 of the embodiment includes a plurality of light sources 2 and the light guide plate 3.

In addition, the light guide plate 3 has a light entering section 4, a light diffuser 5, a reflection surface 6, and a light emission surface 7. The light guide plate 3 has a first surface and a second surface, which extend in a direction in which the light L advances.

The plurality of light sources 2 are LED modules in which LEDs are mounted in packages. LEDs configured to emit red light (hereinafter, simply referred to as light) are used in the LED module.

In addition, high output type LEDs for lighting of the vehicle are used as the LEDs. The light sources 2 radially emit the light L radiated from the LED module in directions that are parallel to each other (hereinafter, referred to as directions in which the light L advances). Further, emission elements such as laser diodes (LD) or the like in addition to the above-mentioned LEDs may be used in the light sources 2.

The plurality of light sources 2 is disposed along one end surface (in the embodiment, an upper end surface 3a) of the light guide plate 3 in a leftward/rightward direction at equal intervals. In addition, the light sources 2 are disposed to provide an interval between the upper end surface 3a of the light guide plate 3 and the light sources 2. Accordingly, since the light sources 2 do not come in direct contact with the light guide plate 3, an influence of heat emitted from the light sources 2 to the light guide plate 3 can be avoided.

The light guide plate 3 is a light transmission material formed in a substantially rectangular flat plate shape as a whole. A material having a higher refractive index than that of air, for example, a transparent resin such as polycarbonate, acryl, or the like or glass or the like may be used in the light guide plate 3.

The light entering section 4 has a plurality of incident surfaces 4a respectively disposed at the upper end surface 3a of the light guide plate 3 to be facing the plurality of light sources 2. The light L emitted from the light sources 2 enters the light guide plate 3 from the incident surfaces 4a.

The light diffuser 5 has a plurality of hole sections 8 disposed along the upper end surface 3a of the light guide plate 3 and formed to respectively correspond to the plurality of light sources 2. The plurality of hole sections 8 are disposed at equal intervals to be parallel in the leftward/rightward direction of the light guide plate 3 and correspond to the respective incident surfaces 4a of the light entering section 4.

Specifically, the hole section 8 passes through the light guide plate 3 in a thickness direction and forms a space K at inner side of the light guide plate 3. When seen in a plan view, the hole section 8 is formed in a rectangular shape having a light guide emission surface 8a and a light guide incident surface 8b opposite to each other in the direction in which the light L entering from the incident surfaces 4a (the upper end surface 3a) advances (in the embodiment, an upward/downward direction of the light guide plate 3, longitudinal direction of the light guide plate 3), and a pair of planes 8c and 8d connecting the light guide emission surface 8a and the light guide incident surface 8b.

That is, the light guide emission surface 8a and the light guide incident surface 8b are disposed in parallel to the upper end surface 3a (the incident surfaces 4a) of the light guide plate 3, and the pair of planes 8c and 8d are disposed to be perpendicular to the upper end surface 3a (the incident surfaces 4a) of the light guide plate 3.

Here, the light L emitting from the light source 2 enters the hole section 8 from the incident surface 4a. In addition, the light L entering the hole section 8 from the incident surface 4a is emitted from the light guide emission surface 8a into the space K, and then, reenters the light guide plate 3 from the light guide incident surface 8b.

The hole section 8 is preferably disposed at position as close to the incident surface 4a as possible because the light L radially emitted from the light source 2 is entered to the hole section 8. In addition, the hole section 8 is preferable to have a width that is sufficient to allow the light L from the incident surface 4a to enter the hole section 8. Specifically, the hole section 8 is preferable to have a width that is larger than that of the LED of the above-mentioned LED module. Meanwhile, since efficiency of the light L is decreased when the width of the hole section 8 is too large, the hole section 8 is preferable to be smaller than or equal to a package of the above-mentioned LED module (an outer shape of the light source 2).

A plurality of concave stripe section 9 is formed at each of the light guide emission surface 8a and the light guide incident surface 8b.

The plurality of concave stripe section 9 extend in the thickness direction (the forward/backward direction) of the light guide plate 3 and are formed in parallel in a direction crossing with the direction in which the light L advances (the leftward/rightward direction of the light guide plate 3, the lateral direction of the light guide plate 3).

The concave stripe sections 9 are referred as flute cuts, and each has a concave surface shape with a substantially arc-shaped cross section. Further, in the embodiment, for example, an interval between neighboring concave stripe sections 9 is 0.18 mm, a curvature of each of the concave stripe sections 9 is 0.1 mm, and a depth of each of the concave stripe sections 9 is 0.07 mm. In addition, an interval between the light guide emission surface 8a and the light guide incident surface 8b (a width of the planes 8c and 8d) is 2 mm.

The plurality of concave stripe sections 9 arranged at the light guide emission surface 8a side and the plurality of concave stripe sections 9 arranged at the light guide incident surface 8b side are arranged by having a phase shifted with each other in the direction crossing with the direction in which the light L advances (the leftward/rightward direction of the light guide plate 3, the lateral direction of the light guide plate 3).

Figure 4A:
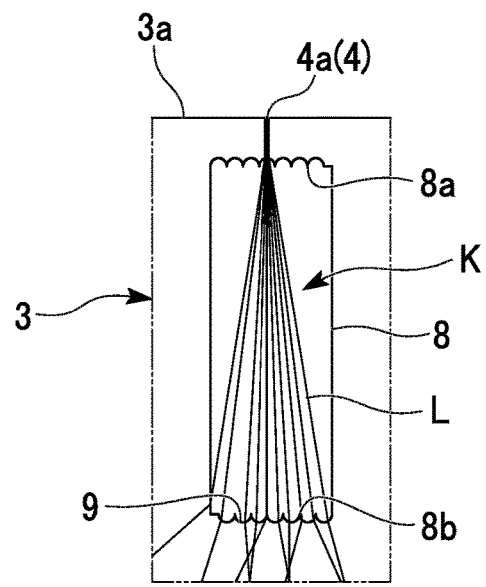
FIG. 4A is a plan view for describing disposition of concave stripe section formed at a light guide emission surface and a light guide incident surface of the hole section.
Figure 4B:
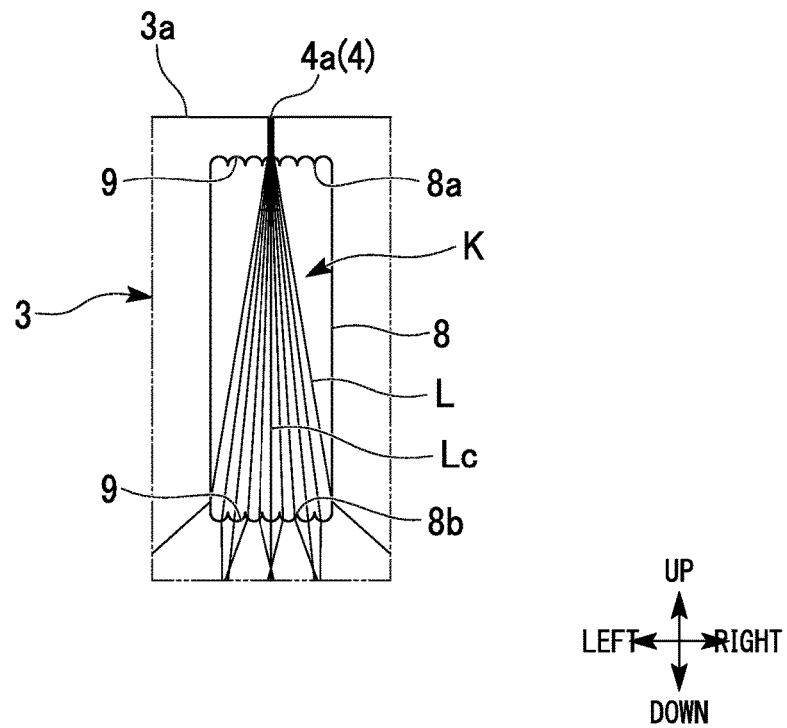
FIG. 4B is a plan view for describing disposition of concave stripe section formed at a light guide emission surface and a light guide incident surface of the hole section.

Here, an arrangement of the concave stripe sections 9 will be described with reference to FIGS. 4A and 4B. Further, FIG. 4A is a plan view showing an optical path of the light L entering the hole section 8 when the concave stripe sections 9 (phases of the concave stripe sections 9) are shifted with each other at the light guide emission surface 8a side and the light guide incident surface 8b side. FIG. 4B is a plan view showing the optical path of the light L entering the hole section 8 when the concave stripe sections 9 (the phases of the concave stripe sections 9) coincide with each other at the light guide emission surface 8a side and the light guide incident surface 8b side.

As shown in FIG. 4A, when the concave stripe sections 9 (the phases of the concave stripe sections 9) are shifted with each other at the light guide emission surface 8a side and the light guide incident surface 8b side, the light L passing through the hole section 8 can be diffused toward the direction crossing with the direction in which the light L advances (the leftward/rightward direction of the light guide plate 3, the lateral direction of the light guide plate 3) regardless of positions at which the light L passes the hole sections 8.

In this case, as the concave stripe sections 9 are shifted by ½ period (pitch), the light can be most efficiently diffused. In addition, the concave stripe sections 9 is preferable to be shifted by at least ¼ period (pitch) or more to obtain such a diffusion effect.

Meanwhile, as shown in FIG. 4B, when the concave stripe sections 9 (the phases of the concave stripe sections 9) coincide with each other at the light guide emission surface 8a side and the light guide incident surface 8b side, light Lc passing through the centers of the concave stripe sections 9 of the light guide emission surface 8a side passes through the centers of the concave stripe sections 9 of the light guide incident surface 8b side as it is without diffusion. In this case, there is a possibility that the so-called luminance (emission) nonuniformity, in which portions that correspond to the positions of the light sources 2 strongly linearly glow, may become conspicuous.

The reflection surface 6 is formed at any of one or the other main surface (in the embodiment, a back surface 3b) side of the light guide plate 3. The reflection surface 6 is formed at the first surface (in the embodiment, the back surface 3b) of the light guide plate 3. Specifically, the reflection surface 6 has a plurality of reflection cuts 6a. The plurality of reflection cuts 6a are, among the back surface 3b of the light guide plate 3, formed throughout a region of a lower section (a back side in the direction in which the light L advances) side rather than a region of an upper section (a front side in the direction in which the light L advances) at which the plurality of hole sections 8 are disposed.

In the reflection surface 6, the light L diffused by the light diffuser 5 is directed toward the light emission surface 7 and reflected by the plurality of reflection cuts 6a at an angle (an incident angle) that is smaller than a critical angle with respect to a back surface 3b of the light guide plate 3.

Further, shapes, sizes, numbers, or the like of the reflection cuts 6a are not particularly limited as long as the light L is reflected at similar angle as mentioned above. For example, in the embodiment, the reflection cuts 6a are constituted by groove sections each having a substantially triangular cross section.

The light emission surface 7 is formed at any of the other or the one main surface (in the embodiment, the front surface 3c) side of the light guide plate 3. The light emission surface 7 is formed at the second surface (in the embodiment, the front surface 3c) of the light guide plate 3. Specifically, the light emission surface 7 constitutes the light emitting surface of the light guide plate 3. The light emission surface 7 is formed throughout a region of the back surface 3b facing the reflection surface 6 (the plurality of reflection cuts 6a).

In the vehicle lamp 1, the light L reflected from the light emission surface 7 by the reflection surface 6 (the plurality of reflection cuts 6a) is emitted toward the outside of the light guide plate 3. Accordingly, the light can be emitted from the light emitting surface of the light guide plate 3.

As described above, in the vehicle lamp 1 of the embodiment, as the plurality of light source 2 is arranged along the one end surface (the upper end surface 3a) of the light guide plate 3, a reduction in a thickness (a reduction in a size) of the vehicle lamp 1 can be achieved.

In addition, in the vehicle lamp 1 of the embodiment, the light L entering each of the incident surface 4a from the light source 2 can be diffused in the direction crossing with the direction in which the light L advances (the leftward/rightward direction of the light guide plate 3, the lateral direction of the light guide plate 3) by the plurality of hole section 8 formed to respectively correspond to the plurality of light source 2.

Further, each of the hole section 8 includes the light guide emission surface 8a and the light guide incident surface 8b opposite to each other in the direction in which the light L advances (the upward/downward direction of the light guide plate 3, the longitudinal direction of the light guide plate 3), and the light L can be diffused by using the plurality of concave stripe section 9 formed at both of the light guide emission surface 8a and the light guide incident surface 8b, without depending on the positions at which the light L passes through the hole section 8. Accordingly, surface emission of the light emitting surface of the light guide plate 3 can be substantially uniformly performed while suppressing occurrence of luminance (emission) nonuniformity when the plurality of light source 2 is disposed in parallel.

Further, the present invention is not necessarily limited to the embodiment and various modifications may be made without departing from the scope of the present invention.

Specifically, in the vehicle lamp 1 of the embodiment, while the configuration in which the plurality of concave stripe section 9 is formed at the light guide emission surface 8a and the light guide incident surface 8b is provided, for example, as shown in FIGS. 5A to 5E, the plurality of concave stripe section 9 or convex stripe section 10 may be formed at least at one of the light guide emission surface 8a and the light guide incident surface 8b.

Figure 5A:
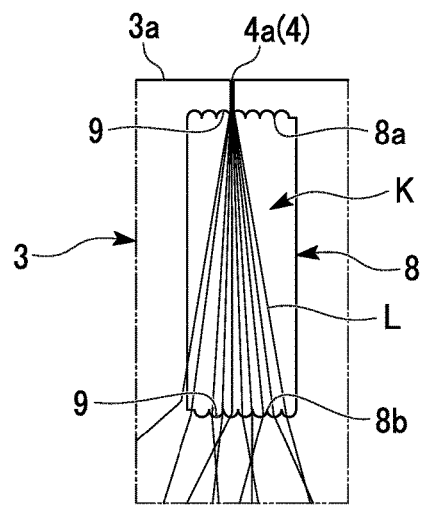
FIG. 5A is a plan view for describing a combination of the concave stripe section and the convex stripe section formed at the light guide emission surface and the light guide incident surface of the hole section.
Figure 5B:
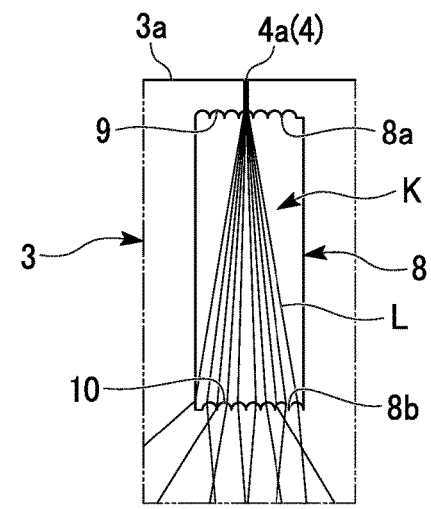
FIG. 5B is a plan view for describing a combination of the concave stripe section and the convex stripe section formed at the light guide emission surface and the light guide incident surface of the hole section.
Figure 5C:
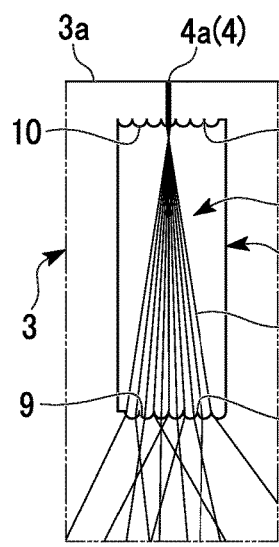
FIG. 5C is a plan view for describing a combination of the concave stripe section and the convex stripe section formed at the light guide emission surface and the light guide incident surface of the hole section.
Figure 5D:
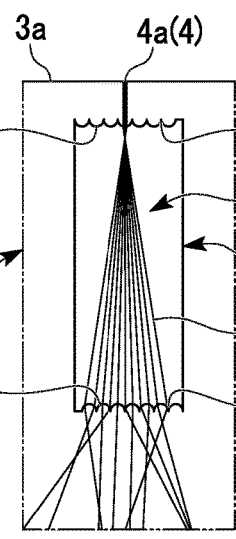
FIG. 5D is a plan view for describing a combination of the concave stripe section and the convex stripe section formed at the light guide emission surface and the light guide incident surface of the hole section.
Figure 5E:
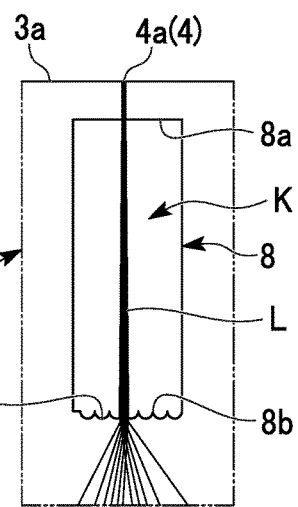
FIG. 5E is a plan view for describing a combination of the concave stripe section and the convex stripe section formed at the light guide emission surface and the light guide incident surface of the hole section.

Further, FIG. 5A is a plan view showing a configuration in which the plurality of concave stripe section 9 is formed at the light guide emission surface 8a and the plurality of concave stripe section 9 is formed at the light guide incident surface 8b, and an optical path of the light L. FIG. 5B is a plan view showing a configuration in which the plurality of concave stripe section 9 is formed at the light guide emission surface 8a and the plurality of convex stripe section 10 is formed at the light guide incident surface 8b, and the optical path of the light L. FIG. 5C is a plan view showing a configuration in which the plurality of convex stripe section 10 is formed at the light guide emission surface 8a and the plurality of concave stripe section 9 is formed at the light guide incident surface 8b, and the optical path of the light L. FIG. 5D is a plan view showing a configuration in which the plurality of convex stripe section 10 is formed at the light guide emission surface 8a and the plurality of convex stripe section 10 is formed at the light guide incident surface 8b, and the optical path of the light L. FIG. 5E is a configuration in which the plurality of concave stripe section 9 is formed at only the light guide incident surface 8b.

In addition, like the concave stripe section 9, the convex stripe section 10 extends in the thickness direction (the forward/backward direction) of the light guide plate 3 and are formed in parallel to the direction crossing with the direction in which the light L advances (the leftward/rightward direction of the light guide plate 3, the lateral direction of the light guide plate 3), but the convex stripe section 10 have shape that are opposite to the concave stripe section 9, i.e., convex surface shape having substantially arc-shaped cross section.

Here, in the configurations shown in FIG. 5A to FIG. 5E, the light L can be most efficiently diffused by the configuration shown in FIG. 5A. Next, the light L can be efficiently diffused by the configuration shown in FIG. 5C, the configuration shown in FIG. 5E, the configuration shown in FIG. 5B, and the configuration shown in FIG. 5D in sequence.

From this, the concave stripe section 9 is preferable to be formed at the light guide incident surface 8b and the light guide emission surface 8a instead of the convex stripe section 10, and the concave stripe section 9 is most preferable to be formed at both of the light guide incident surface 8b and the light guide emission surface 8a.

Figure 6:
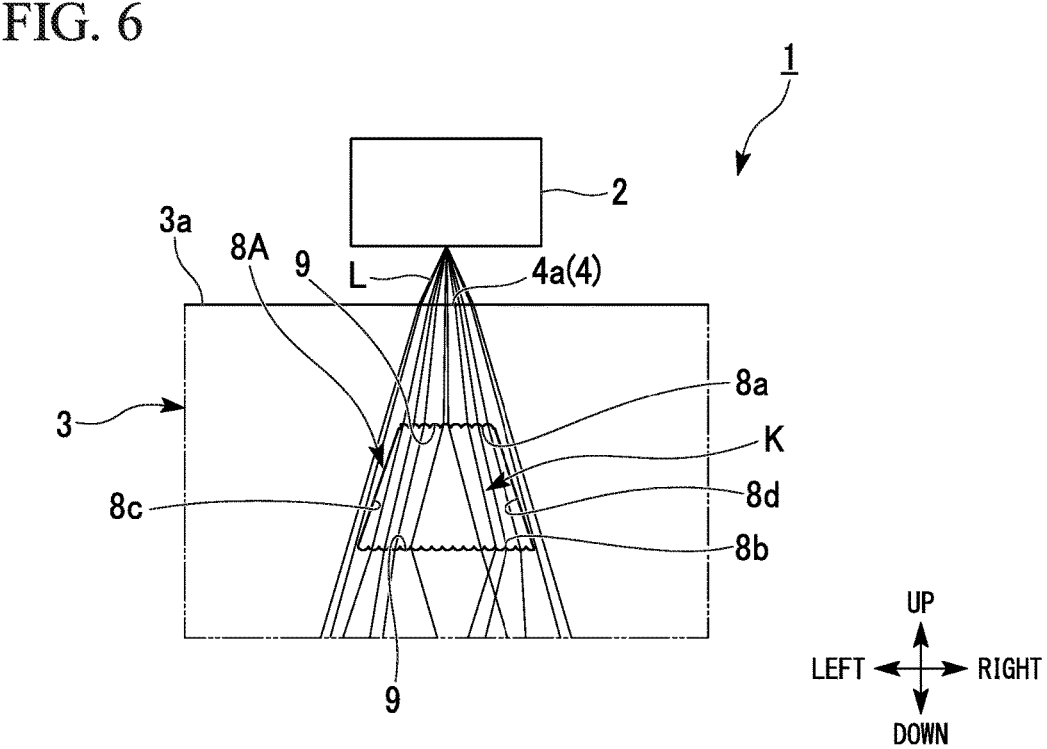
FIG. 6 is a plan view showing another configuration of the hole section and an optical path of light passing through the hole section.

In addition, in the vehicle lamp 1 of the embodiment, instead of the hole section 8, for example, a configuration in which a hole section 8A as shown in FIG. 6 is formed can also be provided. Further, FIG. 6 is a plan view showing a configuration of the hole section 8A and an optical path of the light L passing through the hole section 8A.

The hole section 8A has a width of the light guide incident surface 8b that is larger than a width of the light guide emission surface 8a in the direction crossing with the direction in which the light L advances (the leftward/rightward direction of the light guide plate 3, the lateral direction of the light guide plate 3). In the case of the configuration, the light L passing through the hole section 8A can be widely diffused in the direction crossing with the direction in which the light L advances.

Figure 7:
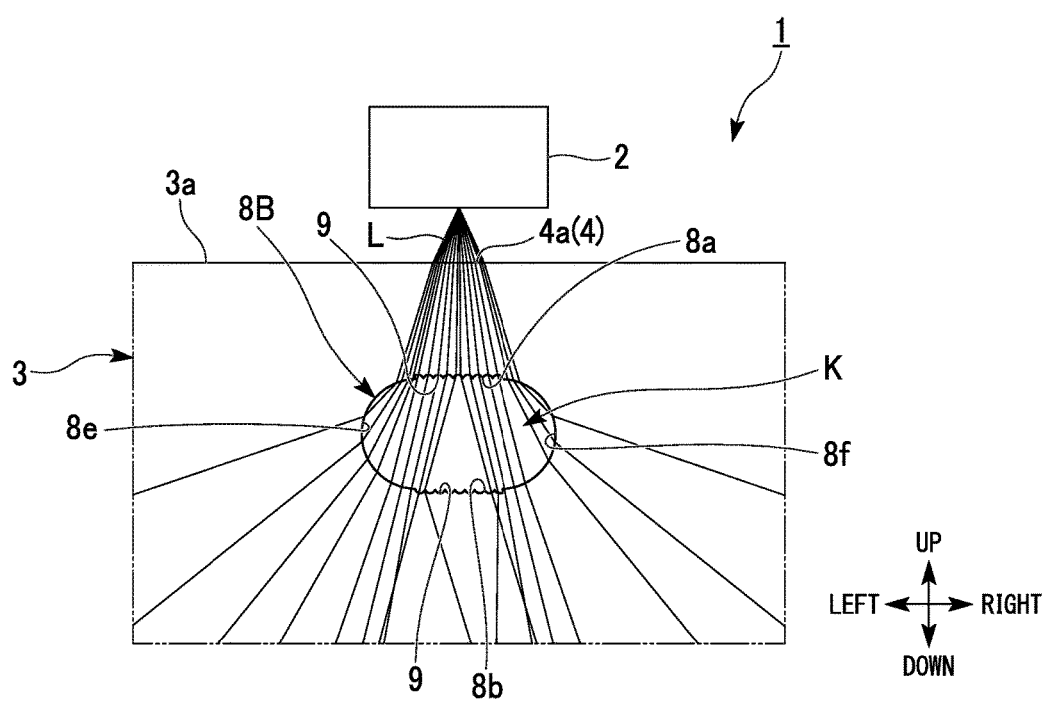
FIG. 7 is a plan view showing another configuration of the hole section and an optical path of light passing through the hole section.

In addition, in the vehicle lamp 1 of the embodiment, for example, a configuration in which, a hole section 8B as shown in FIG. 7 is formed instead of the hole section 8 can be provided. Further, FIG. 7 is a plan view showing a configuration of the hole section 8B and an optical path of the light L passing through the hole section 8B.

The hole section 8B has a pair of concave surfaces 8e and 8f connecting the light guide emission surface 8a and the light guide incident surface 8b. In the case of the configuration, the light L passing through the hole section 8B can be widely diffused in the direction crossing with the direction in which the light L advances (the leftward/rightward direction of the light guide plate 3, the lateral direction of the light guide plate 3) due to a lens effect obtained by the pair of concave surfaces 8e and 8f.

Further, while light can be diffused even when a convex surface connecting the light guide emission surface 8a and the light guide incident surface 8b is formed instead of the concave surfaces 8e and 8f, however, machining of such a shape of hole section would be difficult.

Figure 8A:
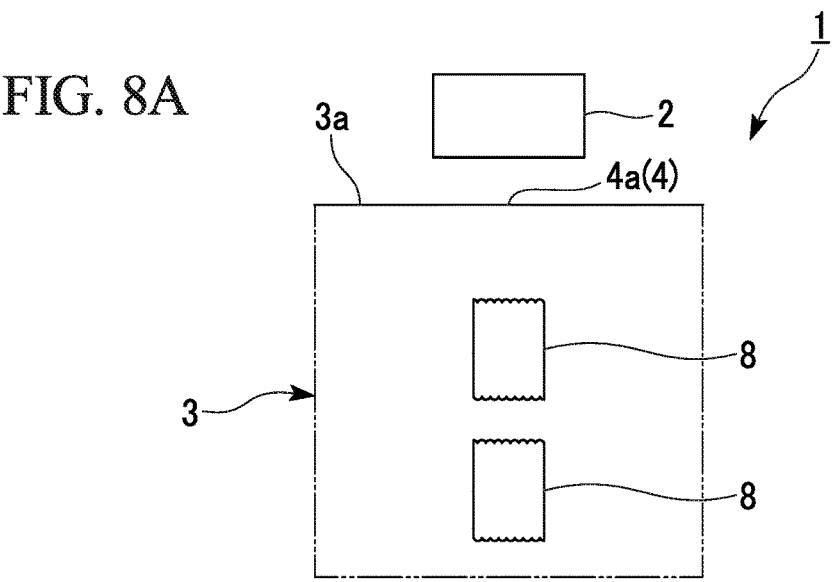
FIG. 8A is a plan view showing another configuration of the hole section and an optical path of light passing through the hole section.
Figure 8B:
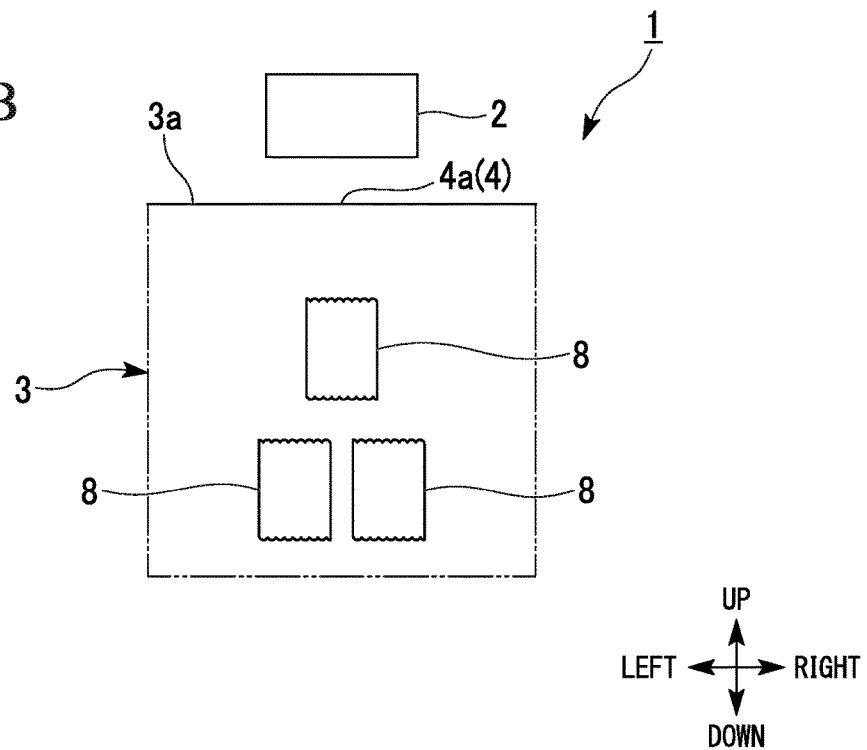
FIG. 8B is a plan view showing another configuration of the hole section and an optical path of light passing through the hole section.

In addition, in the vehicle lamp 1 of the embodiment, for example, as shown in FIGS. 8A and 8B, arranging a multi-stage hole sections 8 in the direction in which the light L advances can also be provided. In the vehicle lamp 1 of the embodiment, for example, a configuration in which the plurality of hole sections 8 are formed to respectively correspond to the plurality of light sources 2 and at least a part of the hole sections 8 are disposed to overlap in the direction in which the light L advances inside the light guide plate 3 can also be provided. Further, FIGS. 8A and 8B are plan views exemplarily showing arrangements of the hole sections 8.

Specifically, in the configuration shown in FIG. 8A, the hole sections 8 are linearly arranged in the direction in which the light L advances (the upward/downward direction of the light guide plate 3, the longitudinal direction of the light guide plate 3). Meanwhile, in the configuration shown in FIG. 8B, the hole sections 8 arranged in the direction in which the light L advances (the upward/downward direction of the light guide plate 3, the longitudinal direction of the light guide plate 3) are disposed to be shifted in the direction crossing with the direction in which the light L advances (the leftward/rightward direction of the light guide plate 3, the lateral direction of the light guide plate 3). In addition, the disposition of the hole sections 8 is increased from the front side (an upper section of the light guide plate 3) toward the back side (a lower section of the light guide plate 3) in the direction in which the light L advances.

For every configurations, the light L can be repeatedly diffused in the direction crossing with the direction in which the light L advances (the leftward/rightward direction of the light guide plate 3, the lateral direction of the light guide plate 3) by passing through each of the hole sections 8.

Further, the vehicle lamp 1 of the embodiment is not limited to the configuration in which the space K is provided inside the hole section 8, but may also have a configuration in which a medium having a refractive index that is smaller than a refractive index of the light guide plate 3 is filled in the hole section 8.

In addition, while the light guide plate 3 has a configuration in which the light entering section 4, the light diffuser 5, the reflection surface 6, and the light emission surface 7 are integrally provided, some of these may be divided. For example, the light guide plates 3 divided into a portion that constitutes the light entering section 4 and the light diffuser 5 and a portion that constitutes the reflection surface 6 and the light emission surface 7 may also be integrally combined to form the light guide plate 3.

Further, in the embodiment, while the case in which the present invention is applied to the above-mentioned vehicle lamp such as a tail lamp or the like has been exemplified, in addition to the above-mentioned configuration, for example, the vehicle lamp may also be combined with another member such as an extension, an outer lens, an inner lens, a reflector, or the like when the tail lamp is configured.

In addition, the present invention is not limited to a vehicle lamp such as a tail lamp or the like, but may be widely applied to a vehicle lamp including a plurality of light sources and a light guide plate.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising: a plurality of light sources; and a light guide plate configured to guide light from the plurality of light sources, wherein the plurality of light sources are disposed in parallel along one end surface of the light guide plate, the light guide plate has a light diffuser configured to diffuse the light in a direction crossing with a direction in which light entering from the one end surface advances, the light diffuser has a plurality of hole sections formed to respectively correspond to the plurality of light sources, each hole section passes through the light guide plate in a thickness direction and comprises a light guide emission surface and a light guide incident surface opposite to each other in the direction in which the light entering from the one end surface advances, a plurality of concave stripe sections each including a concave surface shape having a substantially arc-shaped cross section or a plurality of convex stripe sections each including a convex surface shape having a substantially arc-shaped cross section are provided at both of the light guide emission surface and the light guide incident surface of each hole section in the direction crossing the direction in which the light advances.

2. The vehicle lamp according to claim 1, wherein the concave stripe sections or the convex stripe sections provided at both of the light guide emission surface and the light guide incident surface of each hole section are arranged to be shifted in the direction crossing with the direction in which the light advances with each other.

3. The vehicle lamp according to claim 2,
wherein a width of the light guide incident surface is set to be larger than a width of the light guide emission surface in the direction crossing with the direction in which the light advances.

4. The vehicle lamp according to claim 1,
wherein the hole section comprises a pair of concave surfaces that are disposed at both sides in the direction crossing with the direction in which the light advances and that connect the light guide emission surface and the light guide incident surface.

5. The vehicle lamp according to claim 1,
wherein the plurality of hole sections is formed to respectively correspond to the plurality of light sources and is arranged in a multi-stage arrangement in the direction in which the light advances.

6. The vehicle lamp according to claim 1,
wherein the concave stripe sections or the convex stripe sections formed at the light guide emission surface and the light guide incident surface are arranged to have a phase shift between each other in the direction crossing with the direction in which the light advances.

7. The vehicle lamp according to claim 6,
wherein the concave stripe sections or the convex stripe sections formed at the light guide emission surface and the light guide incident surface are arranged so that the phase shift between each other is at least ¼ period or more.

8. The vehicle lamp according to claim 6,
wherein the concave stripe sections or the convex stripe sections formed at the light guide emission surface and the light guide incident surface are arranged so that the phase shift between each other is ½ period.

9. The vehicle lamp according to claim 1,
wherein a width of the hole section is smaller than or equal to an outer shape of the plurality of light sources.

10. The vehicle lamp according to claim 9,
wherein the plurality of light sources are LED modules in which LEDs are mounted in packages, and
the outer shape of the plurality of light sources is the packages of the LEDs.

11. The vehicle lamp according to claim 10,
wherein the width of the hole section arranged in a multi-stage arrangement is smaller than or equal to the outer shape of the plurality of light sources.

12. The vehicle lamp according to claim 1,
wherein the light guide emission surface and the light guide incident surface are parallel to the one end surface.

13. The vehicle lamp according to claim 12,
wherein a width of the hole section is smaller than or equal to an outer shape of the plurality of light sources.

14. A vehicle lamp comprising: a plurality of light sources; and a light guide plate configured to guide light from the plurality of light sources, wherein the plurality of light sources are disposed in parallel along one end surface of the light guide plate, the light guide plate has a light diffuser configured to diffuse the light in a direction crossing with a direction in which light entering from the one end surface advances, the light diffuser has a plurality of hole sections formed to respectively correspond to the plurality of light sources, each hole section passes through the light guide plate in a thickness direction and comprises a light guide emission surface and a light guide incident surface opposite to each other in the direction in which the light entering from the one end surface advances, and a plurality of concave stripe sections each including a concave surface shape having a substantially arc-shaped cross section are provided at both of the light guide incident surface and the light guide emission surface of each hole section in the direction crossing the direction in which the light advances.

15. The vehicle lamp according to claim 14,
wherein the concave surface shape formed at the light guide incident surface is shifted in the direction crossing the direction in which the light advances with respect to the concave surface shape that is formed at the light guide emission surface.

16. The vehicle lamp according to claim 15,
wherein a width of the light guide incident surface is larger than a width of the light guide emission surface in the direction crossing with the direction in which the light advances.

17. The vehicle lamp according to claim 14,
wherein the hole section comprises a pair of concave surfaces that are disposed at both sides in the direction crossing with the direction in which the light advances and that connect the light guide emission surface and the light guide incident surface.

18. The vehicle lamp according to claim 14,
further comprising a plurality of hole sections formed to respectively correspond to the plurality of light sources and arranged in a multi-stage arrangement in the direction in which the light advances.

19. The vehicle lamp according to claim 14,
wherein the concave surface shape formed at the light guide incident surface and the concave surface shape formed at the light guide emission surface are arranged to have a phase shift between each other in the direction crossing with the direction in which the light advances.

* * * * *